Patented Apr. 8, 1952

2,592,248

UNITED STATES PATENT OFFICE 2,592,248

ALPHA-ACYLAMINO ACRYLAMIDES AND POLYMERS THEREOF

Harry W. Coover, Jr., and Joseph B. Dickey, Rochester, N. Y., assignors to Eastman Kodak Company, Rochester, N. Y., a corporation of New Jersey No Drawing. Application December 9, 1949, Serial No. 132,215

15 Claims. (Cl. 260—85.5)

This invention relates to alpha-acylamino acrylamides, to polymers thereof, and to processes for their preparation.

The new compounds of the invention can be represented by the general formula:

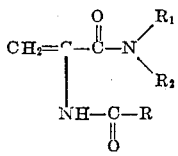

wherein R represents an alkyl group containing from 1 to 3 carbon atoms (e. g. methyl, ethyl, propyl or isopropyl) and $R_1$ and $R_2$ represent an atom of hydrogen, an alkyl group containing from 1 to 18 carbon atoms which can be substituted by one or more monovalent substituents such as an atom of fluorine, a nitrile group, a hydroxyl group, a carbamyl group, an alkylsulfonyl group, etc. (e. g. $R_1$ and $R_2$ can be methyl, ethyl, propyl, isopropyl, butyl, sec. butyl, tert. butyl, isobutyl, dodecyl, cetyl stearyl cyanomethyl, $\beta$-cyanoethyl, carbamylmethyl, $\beta,\beta$-difluoroethyl, $\beta,\beta,\beta$-trifluoroethyl, $\beta$-hydroxyethyl, $\beta$-hydroxypropyl, $\omega$-hydroxypropyl, $\beta$-methylsulfonylethyl, etc. groups), an aralkyl group of the benzene series wherein the alkylene group contains from 1 to 2 carbon atoms (e. g. benzyl or phenylethyl groups), an aryl group of the benzene series containing from 6 to 8 carbon atoms (e. g. phenyl, tolyl, xylyl, chlorophenyl, nitrophenyl, etc. groups) and a cycloalkyl group containing from 5 to 6 carbon atoms in the ring (e. g. cyclopentyl and cyclohexyl groups). The above-defined compounds are white crystalline substances having a wide range of solubilities. The simple amides, i. e. those wherein both $R_1$ and $R_2$ are hydrogen atoms, are all soluble in water, whereas the more complex amides wherein one or both $R_1$ and $R_2$ are groups as above specified are insoluble in water but soluble in volatile organic solvents such as methanol, ethanol, acetonitrile, dimethyl formamide, etc. The new $\alpha$-acylamino acrylamides above-defined are valuable starting materials for the synthesis of other useful organic substances, for example, pharmaceuticals. They are polymerizable alone or conjointly with other unsaturated organic compounds to valuable resinous products. Such resins are characterized by being more hydrophilic than simple polyacrylamides, i. e., acrylamides not substituted in the alpha-position by an acylamino group, and show greatly increased affinity for acidic, basic, direct and vat dyestuffs.

It is, accordingly, an object of the invention to provide new alpha-acylamino acrylamide compounds. Another object is to provide new homopolymers and copolymers of alpha-acylamino acrylamides. A further object is to provide methods for preparing the new monomers and copolymers. Other objects will become apparent hereinafter.

In accordance with the invention, the new alpha-acylamino acrylamides are prepared by reacting a monomeric alpha-acylamino acrylate with ammonia or with a primary or a secondary amine and recovering the acrylamide product in crystalline form from the reaction mixture by cooling and crystallization. Advantageously, the reaction is carried out in an inert liquid medium such as water, a saturated monohydric aliphatic alcohol (e. g. methanol, ethanol, isopropanol, etc.), a glycol (e. g. ethylene glycol, diethylene glycol, etc.) and aqueous solutions of the mentioned alcohols. While stoichiometric proportions of the reactants can be employed, the best results are obtained with an excess of the ammonia or of the desired amine. In the reaction with ammonia, the alcoholic or aqueous solution of the $\alpha$-acylamino acrylate is kept saturated with ammonia gas until the reaction is complete, while in the reaction with an amine, from 1 to 5 gram-moles of the amine is present to each gram-mole of the alpha-acylamino acrylate. While greater proportions of the amine can be employed, no particular advantage is gained by such practice. The temperature of the reaction can be advantageously maintained from 20 to 100° C., but satisfactory yields of the alpha-acylamino acrylamides can be obtained by allowing the reaction to proceed at room temperature until it is completed. Advantageously, a trace (0.001 to 0.1%) of a polymerization inhibitor such as hydroquinone, a trinitrobenzene such as 1,3,5-trinitrobenzene, etc. is employed in the above reaction.

Suitable $\alpha$-acylamino acrylate intermediates which can be employed in the above-described process to give the new compounds of the invention can be represented by the general formula:

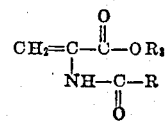

wherein R has the same meaning as previously given and $R_3$ represents an alkyl group such as methyl, ethyl, n-propyl, isopropyl, n-butyl, sec.-butyl, ter.-butyl, etc. groups, e. g. an alkyl group of the formula $C_nH_{2n+1}$ wherein n represents a positive integer from 1 to 4, an aralkyl group wherein the alkyl group contains from 1 to 2 carbon atoms such as benzyl or phenylethyl and an aryl group of the benzene series containing from 6 to 8 carbon atoms such as phenyl, tolyl, etc. The above-defined intermediates can be prepared by the general method described in our copending application Serial No. 87,356, filed April 13, 1949 (now U. S. Patent 2,548,518, dated April 10, 1951), by reacting an alkali metal salt of an α-acylamino acrylic acid with a dialkyl sulfate or with a diaralkyl or diaryl sulfate of the benzene series. The alkali metal salts of α-acylamino acrylic acid employed in the above procedure can be prepared as described in our copending application Serial No. 132,216, filed of even date herewith, by the process of reacting in the proportion of 2 gram-moles of an acylamide with 1 gram-mole of pyruvic acid at 100 to 110° C. at 10–15 mm. pressure for a period of 3 to 5 hours, to obtain the corresponding α,α-diacylamide propionic acid, then heating the latter compound in from 1 to 10 volumes of glacial acetic acid at refluxing temperature, for a period of from several minutes for some members to as much as several hours for other members, thereby splitting off one of the acylamide groups, and then separating the alpha-acylamino acrylic acid which forms by conventional methods, for example, by cooling the reaction mixture so that the product in most cases precipitates out of the mixture in excellent yield. Suitable amines which can be used in the reaction with the alpha-acylamino acrylate intermediates include primary and secondary alkylamines (e. g. methylamine, dimethylamine, ethylamine, diethylamine, propylamine, dipropylamine, isopropylamine, diisopropylamine, butylamine, dibutylamine, diisobutylamine, sec. butylamine, disec. butylamine, tert. butylamine, ditert. butylamine, dodecylamine, didodecylamine, cetylamine, dicetylamine, stearylamine, cyanomethylamine, di-cyanomethylamine, β-cyanoethylamine, di-β-cyanoethylamine, β-hydroxyethylamine, di-β-hydroxyethylamine, β,β - difluoroethylamine, di - β,β - difluoroethylamine, β,β,β-trifluoroethylamine, di-β,β,β-trifluoroethylamine, β - methylsulfonylethylamine, glycineamide, etc.) aralkylamines wherein the aryl group is a member of the benzene series (e. g. benzylamine, dibenzylamine, β-phenylethylamine, etc.), arylamines of the benzene series (e. g. aniline, toluidine, xylidene, diphenylamine, etc.) and cycloalkylamines (e. g. cyclopentylamine, cyclohexylamine, etc.).

The polymerization of the new alpha-acylamino acrylamides alone or conjointly with one or more other unsaturated compounds is accelerated by heat, by actinic light and by polymerization catalysts such as organic peroxides (e. g. benzoyl peroxide, acetyl peroxide, lauroyl peroxide, tertiary butyl hydroperoxide, etc.), hydrogen peroxide, persulfuric acid and persulfates (e. g. ammonium persulfate, sodium persulfate, potassium persulfate, etc.), perborates (e. g. sodium perborate and other alkali metal perborates), the water-soluble salts of percarbonic acid, the water-soluble salts of perphosphoric acid and the water-soluble salts of sulfo-per-acids (Caro's acid). The organic peroxides are especially suitable. Mixture of catalysts can be employed. An activating catalyst such as sodium bisulfite can be used in conjunction with the polymerization catalysts.

The polymerizations can be carried out in mass or in the presence of an inert solvent such as acetone, methyl ethyl ketone, saturated aliphatic monohydric alcohols containing from 1 to 4 carbons (e. g. methanol, ethanol, n-propanol, isopropanol and the butanols), acetonitrile, tetrachloroethylene, benzene, toluene, dimethyl formamide, etc.

The monomers can also be dispersed in a non-solvent for the monomers, the particles of dispersed monomers being very small (emulsion) or relatively large (granular). For emulsion polymerization, any non-solvent for the monomers can be employed, water being especially advantageous for the preparation of some of the copolymers. Mixtures of monomers can be advantageously emulsified in the water using emulsifying agents such as salts of higher fatty acids (e. g. sodium or potassium stearate, palmitate, etc.), ordinary soaps, salts of higher fatty alcohol sulfates (e. g. sodium or potassium cetyl sulfate, sodium or potassium lauryl sulfate, sodium or potassium stearyl sulfate, etc.), salts of aromatic sulfonic acids (e. g. sodium or potassium salts of alkylnaphthalene sulfonic acids, etc.) and higher molecular weight quaternary ammonium salts (e. g. dimethylbenzylphenyl ammonium chloride, quaternary salts containing the radicals $C_{15}H_{31}$ and $C_{17}H_{35}$, etc). For bead or granular polymerization relatively poor dispersing agents such as starch, methylated starch, gum arabic, polyvinyl alcohol, partly hydrolyzed polyvinyl acetate, gelatin, sodium glycolate, finely divided magnesium carbonate, etc. can be employed. Mixtures of dispersing agents can be employed. In the polymerizations wherein the monomers are dispersed in non-solvents, the dispersions can be facilitated by stirring, shaking or tumbling the polymerization mixtures.

The new monomers can also be copolymerized with each other or with one or more other polymerizable unsaturated organic compounds to high molecular weight resins, for example, with compounds containing only ethylenic unsaturation such as vinyl esters of carboxylic acids (e. g. vinyl acetate, vinyl butyrate, vinyl stearate, vinyl trifluoroacetate, vinyl benzoate, etc.), vinyl alkyl ketones (e. g. methyl vinyl ketone, ethyl vinyl ketone, etc), vinyl alkyl ethers (e. g. methyl vinyl ether, ethyl vinyl ether, vinyl-β-trifluoroethyl ether, etc.), vinyl sulfonamides (e. g. vinyl sulfonamide, N-methyl vinyl sulfonamide, N-ethyl vinyl sulfonamide, etc.), vinyl halides (e. g. vinyl chloride, vinyl bromide and vinyl fluoride), vinyl alkyl sulfones (e. g. vinyl methyl sulfone, vinyl ethyl sulfone, etc.) vinyl urethanes (e. g. vinyl methyl urethane, vinyl ethyl urethane, etc.), cyclic vinyl imides (e. g. vinyl succinimide vinyl phthalimide, etc.), acrylic and methacrylic acids and their anhydrides, amides, N-alkyl amides, nitriles and their methyl, ethyl, butyl, benzyl and phenyl esters, ethylene, propylene, isobutylene, butadienes (e. g. butadiene-1,3, α-acetoxy butadiene-1,3, etc.), styrenes (e. g. styrene, o-methylstyrene, p-methylstyrene, 2,4-dichloro - α - methylstyrene, o - acetaminostyrene, etc.), α-acetoxyacrylonitrile, vinylidene chloride, vinylidene chloridefluoride, alkyl esters of maleic and fumaric acids such as methyl maleate, methyl fumarate, fumaronitrile, dimethyl itaconate, cis- and trans-β-cyano- and carboxamidomethyl acrylate, etc.

The copolymers of the invention can contain variable amounts of each comonomer and are obtained with starting polymerization mixtures containing from 5 to 95 parts by weight of the new unsaturates and from 95 to 5 parts by weight of the above-mentioned other unsaturated organic compounds. However, the preferred copolymers contain from 10 to 90% by weight of the new unsaturates and from 90 to 10% by weight of the other unsaturated organic compounds. The proportion of the new alpha-acylamino acrylamides employed in the monomeric mixture has been found to be substantially the same in the polymeric material made from such a mixture in accordance with our invention. The temperature of polymerization for preparing the homopolymers and for the copolymers can be varied widely. Where the polymerization is conducted in the presence of a polymerization activating agent, satisfactory resinous materials are obtained with temperatures as low as 0° C. However, the preferred polymerization temperature is in the range of from 30 to 130° C. Where the polymerization is carried out in a solvent or in suspension in a non-solvent, the monomers can advantageously constitute from 5 to 50% by weight of the mixture.

The following examples will serve to illustrate further our new alpha-acylamino acrylamides, polymers thereof, and the manner of preparing the same.

Preparation of methyl α-acetaminoacrylate.

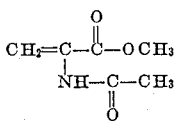

12.9 g. of α-acetaminoacrylic acid and 5.4 g. of sodium methylate in 100 cc. of methanol were refluxed together for 15 minutes. The reaction mixture was cooled and 12.6 g. of dimethyl sulfate containing a trace of 1,3,5-trinitrobenzene were added, and the reaction mixture was refluxed for one hour. 100 cc. of diethyl ether were added and the precipitated salt filtered. After distilling off the diethyl ether and methanol, the remaining viscous product was fractionally distilled to give methyl α-acetamino-acrylate boiling at 66° to 67° C./0.3 mm. It melted at 75° to 76° C. By replacing the dimethyl sulfate in the above procedure with a molecularly equivalent amount of other dialkyl sulfates such as diethyl sulfate, di-n-propyl sulfate, di-isopropyl sulfate, di-n-butyl sulfate, etc. or with diaralkyl or diaryl sulfates of the benzene series corresponding alkyl, aralkyl or aryl α-acetamino acrylates can be prepared. The above procedure can also be employed with other α-acylamino acrylic acids such as with α-propionamino acrylic acid to give the various alkyl, aralkyl and aryl esters of α-propionamino acrylic acid, with α-butyramino acrylic acid to give the various alkyl, aralkyl and aryl esters of α-butyramino acrylic acid, etc. (e. g. methyl α-propionamino acrylate, ethyl α-propionamino acrylate, propyl α-propionamino acrylate, butyl α-propionamino acrylate, methyl α-butyramino acrylate, ethyl α-butyramino acrylate, propyl α-butyramino acrylate, butyl α-butyramino acrylate, etc. All of the above monomeric acrylates polymerize alone or conjointly with other unsaturated organic compounds such as those previously mentioned. Accordingly, a trace of 1,3,5-trinitrobenzene was added to the reaction mixture in the above example to inhibit the polymerization of the formed methyl α-acetamino acrylate. A polymerization inhibitor is also employed in the preparation of the other mentioned acrylate compounds.

*Example 1.—Alpha-acetamino acrylamide*

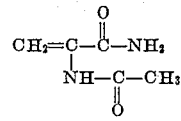

10 g. of methyl α-acetamino acrylate were dissolved in 100 cc. of methanol and the resulting solution saturated with anhydrous ammonia. The solution was allowed to stand for a period of 48 hours at room temperature. Concentration and cooling of the alcoholic solution gave a good yield of white crystalline α-acetamino acrylamide having a melting point of 180° to 182° C. Analysis of this product gave 21.1% by weight of nitrogen compared with calculated theory of 21.8% by weight of nitrogen.

By replacing the methyl α-acetamino acrylate in the above example with a molecularly equivalent amount of other alkyl α-acetamino acrylates such as ethyl α-acetamino acrylate, propyl α-acetamino acrylate, butyl α-acetamino acrylate, benzyl α-acetamino acrylate, phenyl α-acetamino acrylate, etc., similarly good yields of α-acetamino acrylamide are obtained.

*Example 2.—N-ethyl-α-acetamino acrylamide*

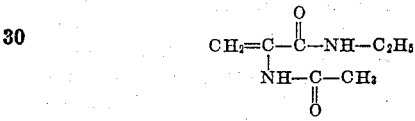

14. g. of methyl α-acetamino acrylate, 5 g. of ethylamine and a trace of hydroquinone were dissolved in 75 cc. of 50% aqueous methanol. The reaction mixture was allowed to stand at room temperature for 48 hours. Concentration and cooling gave a 67% by weight yield of white crystalline N-ethyl-α-acetamino acrylamide. It contained 17.7% by weight of nitrogen compared with calculated theory of 17.9% by weight of nitrogen.

In place of the methyl α-acetamino acrylate in the above example, there can be substituted a molecularly equivalent amount of methyl α-propionamino acrylate to give N-ethyl-α-propionamino acrylamide or of methyl α-butyramino acrylate to give N-ethyl-α-butyramino acrylamide.

*Example 3.—N-phenyl-α-acetamino acrylamide*

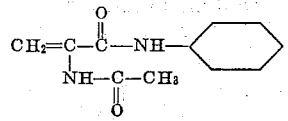

14 g. of methyl α-acetamino acrylate, 10 g. of aniline and a trace of hydroquinone were dissolved in 100 cc. of methanol. The solution was warmed on a steam bath for 6 hours. Concentration and cooling of the solution then gave a good yield of white crystalline N-phenyl-α-acetamino acrylamide. Analysis for nitrogen gave 13.4% by weight compared with 13.7% for calculated theoretical nitrogen content.

In place of the methyl α-acetamino acrylate in the above example, there can be substituted a molecularly equivalent amount of methyl α-propionamino acrylate, or methyl α-butyramino acrylate to give N-phenyl-α-propionamino acrylamide and N-phenyl-α-butyramino acrylamide, respectively.

Example 4.—N,N-dimethyl-α-acetamino acrylamide

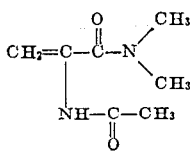

10 g. of methyl α-acetamino acrylate and 8 g. of dimethylamine were added to 100 cc. of methanol. After standing at room temperature for a period of 48 hours, the solution was concentrated and cooled, whereupon the N,N-dimethyl-α-acetamino acrylamide was obtained in good yield in the form of white crystals. The polymer contained 17.7% by weight of nitrogen compared with 17.9% by weight calculated theoretical nitrogen content.

In place of the dimethylamine in the above example, there can be substituted a molecularly equivalent amount of other secondary amines such as diethylamine to give N,N-diethyl-α-acetamino acrylamide or dipropylamine to give N,N-dipropyl-α-acetamino acrylamide or dibutylamine to give N,N-dibutyl-α-acetamino acrylamide, dibenzylamine to give N,N-dibenzyl-α-acetamino acrylamide, dicyclohexylamine to give N,N-dicyclohexyl-α-acetamino acrylamide, methylaniline to give N,N-phenylmethyl-α-acetamino acrylamide, etc. The methyl α-acetamino acrylate can also be replaced in the above example with, for example, methyl α-propionamino acrylate, methyl α-butyramino acrylate, and similar alkyl α-acetamino or α-propionamino or α-butyramino acrylates to give on reaction with the above-mentioned secondary amines corresponding N,N-disubstituted α-acylamino acrylamides.

Example 5.—Alpha-propionamino acrylamide

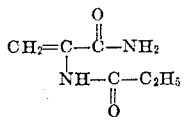

10 g. of methyl α-propionamino acrylate were dissolved in 100 cc. of methanol and the solution then saturated with anhydrous ammonia. After standing for 48 hours at room temperature, the solution was concentrated and cooled, whereupon α-propionamino acrylamide was obtained in good yield in the form of white crystals. The nitrogen content found for the polymer was 19.3% by weight compared with calculated theoretical of 19.7% by weight of nitrogen.

Example 6.—N-isopropyl α-propionamino acrylamide

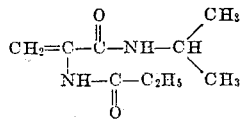

15 g. of methyl α-propionamino acrylate, 6 g. of isopropylamine and a trace of trinitrobenzene were dissolved in 75 cc. of methanol. The reaction mixture was heated at 50° C. for 6 hours. Concentration and cooling gave a 75% by weight yield of white crystalline N-isopropyl-α-propionamino acrylamide. It contained 14.9% by weight of nitrogen compared with calculated theory of 15.2% by weight of nitrogen.

In place of the methyl α-propionamino acrylate in the above example, there can be substituted a molecularly equivalent amount of methyl α-acetamino acrylate to give N-isopropyl-α-acetamino acrylamide or of methyl α-butyramino acrylate to give N-isopropyl-α-butyramino acrylamide.

Example 7.—N-β-cyanoethyl-α-propionamino acrylamide

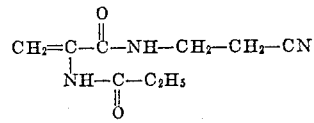

15 g. of methyl α-propionamino acrylate, 7 g. of β-cyanoethylamine and a trace of 1,3,5-trinitrobenzene were dissolved in 60 cc. of methanol. The reaction mixture was heated at 50° C. for 8 hours. Concentration and cooling gave a 60% by weight yield of N-β-cyanoethyl-α-propionamino acrylamide. It contained 21.2% by weight of nitrogen compared with calculated theory of 21.5% by weight of nitrogen.

In place of the methyl α-propionamino acrylate in the above example, there can be substituted a molecularly equivalent amount of methyl α-acetamino acrylate to give N-β-cyanoethyl-α-acetamino acrylamide or of methyl α-butyramino acrylate to give N-β-cyanoethyl-α-butyramino acrylamide.

Example 8.—Poly-α-acetamino acrylamide 10 g. of α-acetamino acrylamide were added to 100 cc. of distilled water to which 0.1 g. of ammonium persulfate and 0.2 g. of sodium bisulfite had been added. The reaction vessel was sealed from the outside air and maintained at 35–40° C. for a period of 18 hours. At the end of this time, a viscous clear solution had formed. Removal of the water gave a hard, clear polymer which had a softening point over 200° C.

By proceeding as described in the above example, other homopolymers can be prepared from any of the new unsaturates, for example, poly α-propionamino acrylamide, poly α-butyramino acrylamide, poly N-phenyl-α-acetamino acrylamide, poly N-phenyl-α-propionamino acrylamide, poly N-phenyl-α-butyramino acrylamide, poly N-ethyl-α-acetamino acrylamide, poly N-ethyl-α-propionamino acrylamide, poly N-ethyl-α-butyramino acrylamide, poly N,N-dimethyl-α-acetamino acrylamide, poly N,N-dimethyl-α-propionamino acrylamide, poly N,N-dimethyl-α-butyramino acrylamide, poly N-isopropyl-α-acetamino acrylamide, poly N-isopropyl-α-propionamino acrylamide, poly N-isopropyl-α-butyramino acrylamide, poly N-β-cyanoethyl-α-acetamino acrylamide, poly N-β-cyanoethyl-α-propionamino acrylamide, poly N-β-cyanoethyl-α-butyramino acrylamide, etc. The polymers wherein $R_1$ and $R_2$ are hydrogen atoms are all water-soluble, whereas the polymers wherein either $R_1$ or $R_2$ or both are substituted are insoluble in water, but soluble in volatile organic solvents such as methanol, ethanol, acetonitrile, dimethyl formamide, etc.

Example 9.—Poly N-methyl-α-acetamino acrylamide 10 g. of N-methyl-α-acetamino acrylamide were added to 100 cc. of distilled water containing 0.5% of hydrogen peroxide. The reaction vessel was sealed from the outside air and maintained at 35–40° C. for 18 hours. A viscous clear solution was formed. Removal of the water gave a hard, tough polymer.

Similar hard and tough polymers were obtained by substituting for the N-methyl-α-acetamino acrylamide a molecularly equivalent amount of N-ethyl-α-acetamino acrylamide, N,N-dimethyl-α-acetamino acrylamide, N-methyl-α-propionamino acrylamide, N-ethyl-α-propionamino acrylamide, N,N-dimethyl-α-propionamino acrylamide, N-methyl-α-butyramino acrylamide, N-ethyl-α-butyramino acrylamide, N,N-dimethyl-α-butyramino acrylamide, etc. The polymers obtained were all soluble in dimethyl formamide.

*Example 10.—Copolymer of α-acetamino acrylamide and acrylonitrile*

A. 2 g. of α-acetamino acrylamide and 8 g. of acrylonitrile were added to 100 g. of water containing 0.1 g. of ammonium persulfate and 0.2 g. of sodium bisulfite. The reaction vessel was sealed from the outside air and maintained at 35–40° C. for 18 hours. A fine, white, insoluble polymer was formed which was filtered off, washed well with water and dried. The polymer was soluble in dimethyl formamide and did not soften below 200° C. A similar fine, white, water-insoluble, dimethyl formamide soluble copolymer was obtained by substituting α-propionamino acrylamide for the α-acetamino acrylamide in the above procedure.

B. 8 g. of α-acetamino acrylamide and 2 g. of acrylonitrile were added to 100 g. of distilled water to which 0.1 g. of ammonium persulfate and 0.2 g. of sodium bisulfite had been added. The reaction mixture was protected from the air and maintained at 35–40° C. for 18 hours. A clear, viscous water solution of the polymer was obtained. Removal of the water gave a hard, tough polymer which was soluble in acetonitrile and dimethyl formamide.

From solutions of the above polymers in volatile solvents, the polymers can be extruded through a spinneret into a cabinet or cell where the solvent is evaporated to give mono-filaments which can be spun into yarn. Such filaments show excellent toughness, flexibility and continuity of structure and high affinity to dyeing by acidic, basic, direct or vat dyestuffs.

*Example 11.—Copolymer of α-acetamino acrylamide and methyl methacrylate*

2 g. of α-acetamino acrylamide, 8 g. of methyl methacrylate and 0.2 g. of benzoyl peroxide were heated at 75° C. for a period of 48 hours. There was obtained a clear, hard and moldable polymer. It was soluble in acetone.

By substituting for the methyl methacrylate in the above example a molecularly equivalent amount of vinyl acetate, methyl acrylate or isopropyl methacrylate similar clear, hard and moldable polymers are obtained. They are soluble in acetone.

*Example 12.—Copolymer of N-methyl-α-acetamino acrylamide, methyl methacrylate, acrylamide and acrylonitrile*

2 g. of N-methyl-α-acetamino acrylamide, 1 g. of methyl methacrylate, 1 g. of acrylamide, 6 g. of acrylonitrile and 0.2 g. of benzoyl peroxide were mixed together, sealed in a tube and heated at 70° C. for a period of 48 hours. A clear, hard polymer was obtained. The polymer was soluble in acetone and was readily molded into shaped objects.

*Example 13.—Copolymer of N-methyl-α-propionamino acrylamide and acrylamide*

5 g. of N-methyl-α-propionamino acrylamide and 5 g. of acrylamide were dissolved in 100 g. of water containing 0.5 g. of hydrogen peroxide. The solution was heated at 60° C. for 48 hours. The mixture polymerized to a clear viscous solution of the polymer. Removal of the water resulted in a hard and tough polymer.

*Example 14.—Copolymer of N,N-dimethyl-α-acetamino acrylamide and diisopropyl fumarate*

5 g. of N,N-dimethyl-α-acetamino acrylamide and 5 g. of diisopropyl fumarate were mixed together and heated in the presence of 0.2 g. of added acetyl peroxide and heated at 60° C. for 48 hours. A clear, hard polymer soluble in acetone and in acetonitrile was obtained. A similar clear, hard polymer is obtained when the diisopropyl fumarate is substituted by a like amount of dimethyl itaconate in the above procedure. This polymer was also soluble in acetone.

*Example 15.—Copolymer of N-ethyl-α-acetamino acrylamide and N,N-dimethyl-sulfonamido styrene*

1 g. of N-ethyl-α-acetamino acrylamide and 4 g. of p-N,N-dimethyl-sulfonamido styrene were dissolved in 50 cc. of acetic acid containing 0.1 g. of acetyl peroxide. Polymerization was completed by heating the mixture at 70° C. for 48 hours. The polymer obtained in solution was completely precipitated by dilution with water. The precipitated polymer was filtered off, washed with water and dried. A good yield of white copolymer was obtained. It was soluble in dimethyl formamide and did not soften below 150° C.

*Example 16.—Copolymer of α-acetamino acrylamide and butadiene*

5 g. of α-acetamino acrylamide and 10 g. of butadiene were copolymerized by heating at 50° C. in the presence of 40 g. of a 1.5% aqueous solution of an alkyl benzene sulfonate as an emulsifying agent, 0.5 g. of hydrogen peroxide as a polymerization initiator, 0.1 g. of diisopropyl-dixanthogen as a polymerization modifier and 0.02 g. of ferrous sulfate. The polymerization was complete in 24 hours. A latex-like dispersion resembling natural rubber latex was obtained.

*Example 17.—Copolymer of α-propionamino acrylamide and vinyl fluoride*

2 g. of α-propionamino acrylamide, 10 g. of vinyl fluoride, 2 g. of soap, 0.1 g. of ammonium persulfate and 0.2 g. of ammonium bisulfite were added to 100 cc. of distilled water contained in a pressure bottle. After heating at 40° C. for 20 hours, an excess of acetic acid was added, and the precipitated white polymer which came out of solution was filtered off, washed with water and dried. The polymer did not soften below 150° C.

A similar copolymer is obtained when the vinyl fluoride in the above example is substituted by a like amount of vinyl chloride.

*Example 18.—Copolymer of α-acetamino acrylamide and vinylidene fluoride*

3 g. of α-acetamino acrylamide, 10 g. of vinylidene fluoride, 2 g. of soap and 0.2 g. of ammonium persulfate were added to 100 g. of distilled water in a pressure bottle. After heating at 45° C. for 24 hours, an excess of acetic acid was added, and the white copolymer which precipitated out of solution was filtered off, washed well with water and dried. The polymer did not soften below 150° C.

By substituting for the vinylidene fluoride in the above procedure a like amount of vinylidene chloride, a copolymer of α-acetamino acrylamide and vinylidene chloride having generally similar properties was obtained. It was soluble in cyclohexanone.

*Example 19.—Copolymer of α-butyramino acrylamide and acrylonitrile*

3 parts by weight of α-butyramino acrylamide and 7 parts by weight of acrylonitrile were added to 100 parts by weight of water containing 0.1 parts by weight of ammonium persulfate and 0.2 parts by weight of sodium bisulfite. The reaction vessel was sealed from the outside air and maintained at 35–40° C. for a period of 18 hours. A fine, white powdery precipitate of the polymer was obtained. It was filtered off, washed with water and dried. The polymer was soluble in dimethyl acetamide and in dimethyl formamide and did not soften below 190° C.

Proceeding as shown in the foregoing examples, other copolymers can be prepared, for example, from monomeric mixtures containing 5% by weight of one or more of the new α-acylamino acrylamides, 10% by weight of one or more of the new α-acylamino acrylamides, 15% by weight of one or more of the new α-acylamino acrylamides, 30% by weight of one or more of the new α-acylamino acrylamides, 40% by weight of one or more of the new α-acylamino acrylamides, 60% by weight of one or more of the new α-acylamino acrylamides, 70% by weight of one or more of the new α-acylamino acrylamides, 90% by weight of one or more of the new α-acylamino acrylamides, 95% by weight of one or more of the new α-acylamino acrylamides, the remainder of the copolymer in each case being one or more of the other unsaturated organic compounds mentioned as suitable comonomers for preparing the copolymers of the invention.

The polymer, i. e., homopolymers and copolymers, prepared in accordance with the invention are water-soluble in the case of those members wherein $R_1$ and $R_2$ are hydrogen atoms, whereas the members wherein $R_1$ or $R_2$ or both are substituted by alkyl, aralkyl, aryl, cycloalkyl, etc. groups, are insoluble in water, but soluble in one or another volatile solvent such as in acetone, methanol, ethanol, acetonitrile, dimethyl formamide, etc., to viscous dope-like solutions. Such dopes can also contain added fillers, conditioning agents, dyestuffs, etc. From such dopes, the polymers can be extruded through a spinneret into a cabinet or cell where the solvent is evaporated to give mono-filaments which can be spun into yarn. The dopes can also be coated on a film-forming surface of metal or glass, the solvent evaporated and the resulting film stripped from the film-forming surface. The new polymers can also be molded, with or without plasticizers, fillers, coloring matter, etc., by means of extrusion, injection or compression methods into shaped objects which can be worked into finished form by heat and mechanical means. The polymers can also be employed for the preparation of compositions for conditioning of threads, fibers, cloths and other textile materials and as gelatin substitutes and thickening agents.

What we claim is:

1. A process for preparing α-acetamino acrylamide comprising reacting an alkyl α-acetamino acrylate with anhydrous ammonia in a solvent medium of methanol in the proportions of from 1 to 5 gram-moles of the ammonia to each gram-mole of the said alkyl α-acetamino acrylate, at a temperature of from 20° to 100° C., and separating the α-acetamino acrylamide, which forms, from the reaction mixture.

2. A process for preparing α-propionamino acrylamide comprising reacting an alkyl α-propionamino acrylate with anhydrous ammonia in a solvent medium of methanol in the proportions of from 1 to 5 gram-moles of the ammonia to each gram-mole of the said alkyl α-propionamino acrylate, at a temperature of from 20° to 100° C., and separating the α-propionamino acrylamide, which forms, from the reaction mixture.

3. A process for preparing α-butyramino acrylamide comprising reacting an alkyl α-butyramino acrylate with anhydrous ammonia in a solvent medium of methanol in the proportions of from 1 to 5 gram-moles of the ammonia to each gram-mole of the said alkyl α-butyramino acrylate, at a temperature of from 20° to 100° C., and separating the α-butyramino acrylamide, which forms, from the reaction mixture.

4. A copolymer of from 5 to 95% by weight of α-acetamino acrylamide and from 95 to 5% by weight of acrylonitrile.

5. A copolymer of from 5 to 95% by weight of α-propionamino acrylamide and from 95 to 5% by weight of acrylonitrile.

6. A process for preparing a copolymer of α-acetamino acrylamide and acrylonitrile comprising heating a mixture containing from 5 to 95 parts by weight of α-acetamino acrylamide and from 95 to 5 parts by weight of acrylonitrile in the presence of a polymerization catalyst.

7. A process for preparing a copolymer of α-propionamino acrylamide and acrylonitrile comprising heating a mixture containing from 5 to 95 parts by weight of α-propionamino acrylamide and from 95 to 5 parts by weight of acrylonitrile in the presence of a polymerization catalyst.

8. A process for preparing an α-acylamino acrylamide having the general formula:

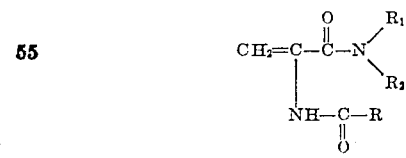

wherein R represents an alkyl group containing from 1 to 3 carbon atoms and $R_1$ and $R_2$ each represent a member selected from the group consisting of hydrogen and an alkyl group containing from 1 to 18 carbon atoms, comprising reacting an α-acylamino acrylate represented by the general formula:

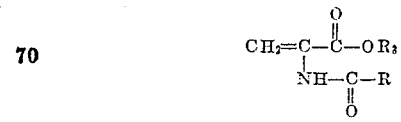

wherein R has the above definition and $R_3$ represents an alkyl group containing from 1 to 4 carbon atoms, with a nitrogen base compound represented by the general formula:

wherein $R_1$ and $R_2$ have the above definitions, in the proportions of from 1 to 5 gram-moles of the said nitrogen base compound to each gram-mole of the said α-acylamino acrylate, at a temperature of from 20° to 100° C., and separating the α-acylamino acrylamide, which forms from the reaction mixture.

9. A process for preparing an α-acylamino acrylamide having the general formula:

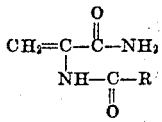

wherein R represents an alkyl group containing from 1 to 3 carbon atoms, comprising reacting an α-acylamino acrylate represented by the general formula:

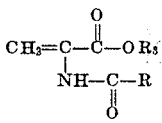

wherein R has the above definition and $R_3$ represents an alkyl group containing from 1 to 4 carbon atoms, with ammonia, in the proportions of from 1 to 5 gram-moles of the ammonia to each gram-mole of the said α-acylamino acrylate, at a temperature of from 20° to 100° C., and separating the α-acylamino acrylamide, which forms, from the reaction mixture.

10. A copolymer of from 5 to 95% by weight of an α-acylamino acrylamide having the general formula:

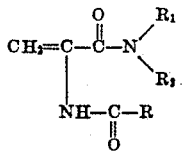

wherein R represents an alkyl group containing from 1 to 3 carbon atoms and $R_1$ and $R_2$ each represent a member selected from the group consisting of hydrogen and an alkyl group containing from 1 to 18 carbon atoms, and from 95 to 5% by weight of another ethylenically unsaturated polymerizable compound.

11. A copolymer of from 5 to 95% by weight of an α-acylamino acrylamide having the general formula:

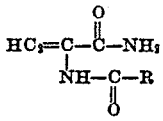

wherein R represents an alkyl group containing from 1 to 3 carbon atoms, and from 95 to 5% by weight of acrylonitrile.

12. A copolymer of from 5 to 95% by weight of α-butyramino acrylamide and from 95 to 5% by weight of acrylonitrile.

13. A process for preparing a copolymer of an α-acylamino acrylamide and another ethylenically unsaturated polymerizable compound, comprising heating a mixture containing from 5 to 95 parts by weight of an α-acylamino acrylamide having the general formula:

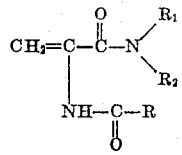

wherein R represents an alkyl group containing from 1 to 3 carbon atoms and $R_1$ and $R_2$ each represent a member selected from the group consisting of hydrogen and an alkyl group containing from 1 to 18 carbon atoms, and from 95 to 5 parts by weight of another ethylenically unsaturated polymerizable compound in the presence of a polymerization catalyst.

14. A process for preparing a copolymer of an α-acylamino acrylamide and acrylonitrile comprising heating a mixture containing from 5 to 95 parts by weight of an α-acylamino acrylamide having the general formula:

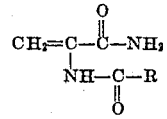

wherein R represents an alkyl group containing from 1 to 3 carbon atoms, and from 95 to 5 parts by weight of acrylonitrile in the presence of a polymerization catalyst.

15. A process for preparing a copolymer of α-butyramino acrylamide and acrylonitrile comprising heating a mixture containing from 5 to 95 parts by weight of a α-butyramino acrylamide and from 95 to 5 parts by weight of acrylonitrile of from 1 to 5 gram-moles of the ammonia to

HARRY W. COOVER, JR.
JOSEPH B. DICKEY.

REFERENCES CITED

The following references are of record in the file of this patent:

UNITED STATES PATENTS

| Number | Name | Date |
|---|---|---|
| 2,384,574 | Stewart | Sept. 11, 1945 |
| 2,401,885 | Semon | June 11, 1946 |
| 2,406,362 | Farlow | Aug. 27, 1946 |

OTHER REFERENCES

Cornell Report, CMR—XIX, August 1944 (published 1947), p. 12.